United States Patent [19]
Paduch et al.

[11] 3,964,253
[45] June 22, 1976

[54] FUEL ENRICHMENT AND HOT START CONTROL APPARATUS IN A FUEL CONTROL

[75] Inventors: Stanley Raymond Paduch, Somers; Kenneth Peter Hansen, Enfield, both of Conn.

[73] Assignee: United Technologies Corporation, Hartford, Conn.

[22] Filed: July 3, 1975

[21] Appl. No.: 593,087

[52] U.S. Cl. .......................... 60/39.14; 60/39.28 T
[51] Int. Cl.² ........................................ F02C 9/08
[58] Field of Search ...... 60/39.14, 39.28 R, 39.28 T

[56] References Cited
UNITED STATES PATENTS

| | | | |
|---|---|---|---|
| 2,862,355 | 12/1958 | Davis et al. | 60/39.14 |
| 2,892,309 | 6/1959 | Sipin | 60/39.14 |
| 2,980,173 | 4/1961 | Perkey | 60/39.14 |
| 3,029,599 | 4/1962 | Chandler et al. | 60/39.28 R |
| 3,196,613 | 7/1965 | Porter et al. | 60/39.28 R |
| 3,319,641 | 5/1967 | Stearns | 60/39.28 R |
| 3,367,107 | 2/1968 | Richardson et al. | 60/39.14 |
| 3,390,522 | 7/1968 | Whitehead | 60/39.14 |
| 3,777,480 | 12/1973 | Stoltman | 60/39.28 R |

*Primary Examiner*—Carlton R. Croyle
*Assistant Examiner*—Robert E. Garrett
*Attorney, Agent, or Firm*—John D. Del Ponti

[57] ABSTRACT

A fuel control utilizes power plant speed and turbine inlet temperature as parameters for controlling the fuel enrichment and hot start protection of the power plant during starting.

6 Claims, 1 Drawing Figure

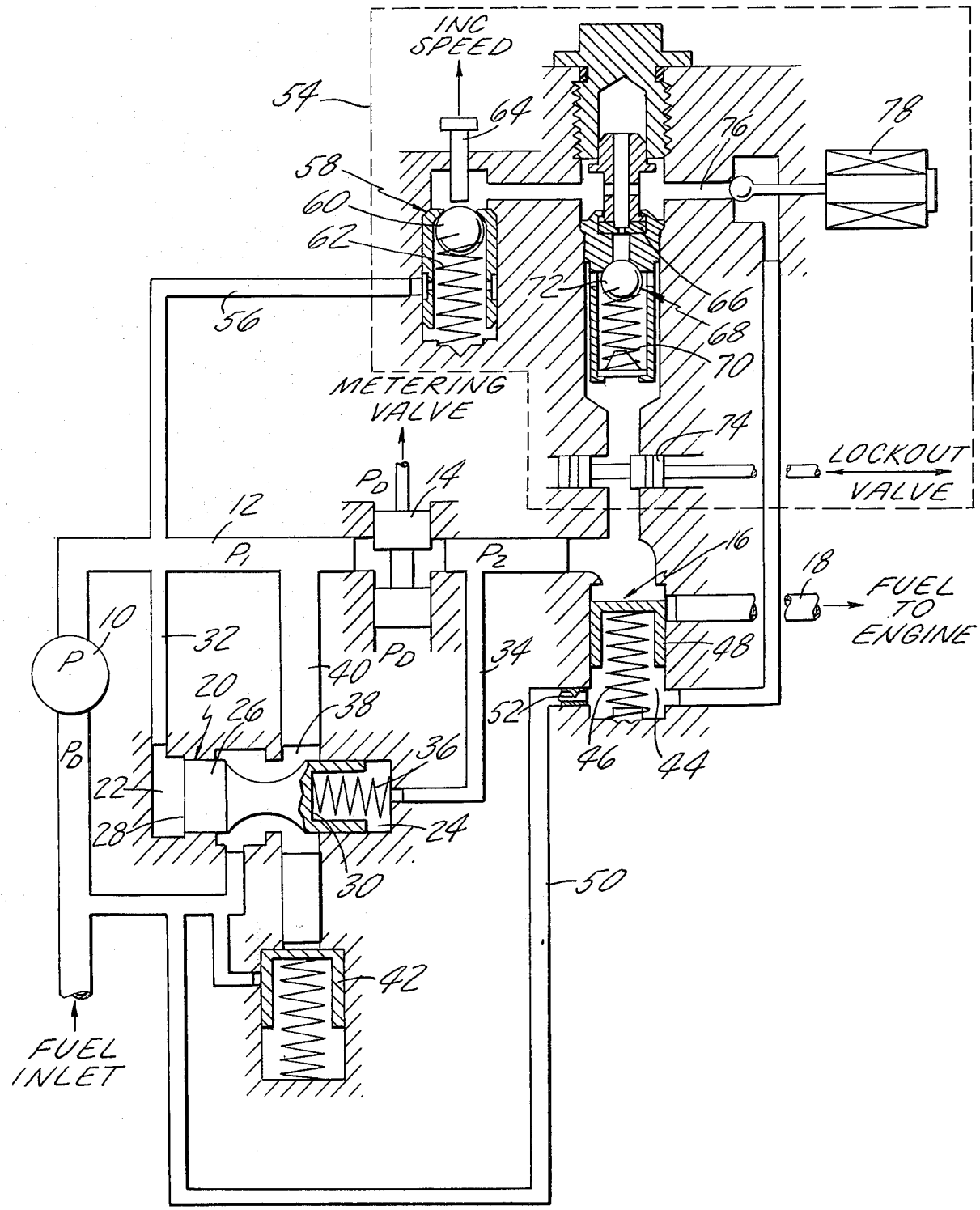

FUEL ENRICHMENT AND HOT START CONTROL APPARATUS IN A FUEL CONTROL

BACKGROUND OF THE INVENTION

This invention relates to fuel controls and more particularly to a fuel control having means for providing, during starting, both fuel enrichment and hot start protection.

It is known that during the starting of a gas turbine engine, when fuel flow has been initiated, the engine is under-speed and under-temperature and it may be necessary, under some operating conditions, to provide extra fuel beyond what is normally required for satisfactory starting.

Typically, the control calls for a scheduled flow of fuel which, unless ignition takes place immediately, often results in an excess of the fuel in the combustion chamber such that when ignition does occur, there is created what is known as a "hot start", which may overheat and damage the turbine.

While previous fuel control systems are capable of providing increased fuel flow during starting, there is a pressing need for one which will not only augment normal fuel flow during under-speed conditions but will also automatically positively shut off all fuel flow to the engine during over-temperature or hot start conditions without, however, presenting a risk of inadvertent shut down once idle is attained.

SUMMARY OF THE INVENTION

It is an object of the present invention to provide an improved fuel control having, in combination, means for enriching fuel flow during engine starting and means for positively stopping all fuel flow in the event of an over-temperature condition during starting only.

In accordance with the present invention, there is provided in a fuel control having main fuel flow passage means connecting the discharge end of a pump to the combustion section of a turbine type power plant via a throttle valve, a fuel enrichment and hot start control system which provides fuel enrichment as a function of turbine speed and positive arrestment of fuel flow as a function of turbine inlet temperature. The invention contemplates, in such a fuel control, an enrichment and control system comprising supplementary passage means in parallel relation with the main passage means so as to communicate the upstream side of the throttle valve with the downstream side thereof, first valve means in the supplementary passage means responsive to turbine speed for permitting the flow of additional fuel only when turbine speed is below idle, an orifice member in the supplementary passage means downstream of the speed responsive valve means through which the flow of additional fuel is caused by a pressure drop substantially equal to the pressure drop across the throttle valve, a pilot controlled, manually operated valve in the supplementary passage means for electing the enrichment function and second valve means responsive to an engine parameter for shunting the additional fuel flow around the orifice member to a shutoff valve for activation thereof. In a preferred embodiment, there is provided in the supplementary passage means a check valve downstream of the orifice member to prevent inadvertent shutdown as a result of system anomolies once a successful start has been achieved.

BRIEF DESCRIPTION OF THE DRAWING

An understanding of the invention will become more apparent to those skilled in the art by reference to the following detailed description when viewed in light of the accompanying drawing which is a schematic illustration in partial cross section showing a fuel control having the fuel enrichment and hot start protection apparatus according to the present invention.

DESCRIPTION OF THE PREFERRED EMBODIMENT

Referring now to the drawing, fuel at drain pressure $P_d$ is pumped in the conventional manner through a positive displacement pump 10 into main line or conduit 12 at increased pressure, $P_1$. The fuel in main line 12 is metered by throttle or metering valve 14 and the metered fuel flows at a pressure $P_2$, past a minimum pressure and shutoff valve 16 into line 18 to the combustion section of a turbine type power plant (not shown). A bypass pressure regulator valve 20 communicates with the upstream and downstream pressure of metering valve 14 and serves to maintain constant the value of the pressure drop across the metering valve.

As shown, the valve 20 includes chambers 22 and 24 which are separated by a spool or pilot valve 26. Valve 26 includes on its opposite ends reaction surfaces 28 and 30 which respond to the forces created by the pressures acting in chambers 22 and 24, respectively, for movement of the spool valve 26. Chamber 22 connects with the pressure upstream of metering valve 14 via line 32 and chamber 24 connects with the pressure downstream of the metering valve 14 via line 34. A spring 36 biases spool valve 26 in a leftward direction and the relative force of the spring and the force responsive areas on the opposite ends of the spool valve 26 determines the position of the spool valve which in turn determines the size of a variable opening 38 in a line 40 which communicates the pressure upstream of throttle valve 14 with drain pressure. The value of the force of the spring 36 is balanced by the value of the pressure drop $(P_1-P_2)$ across the throttle valve 14. As will be appreciated by those skilled in the art the position of the throttle valve 14 is a function of various engine parameters. Suffice it to say that as shown, it is pressure balanced (equal pressure on each end) and moved mechanically in response to those parameters in a conventional manner.

As the pressure differential $(P_1-P_2)$ decreases, indicating a fuel flow deficiency through the given flow area of metering valve 14, spool valve 26 moves in a leftward direction decreasing the size of opening 38 and thus decreasing the flow to drain through spool valve 26. Since the total fuel flow remains unchanged at constant pump speed, this decrease in fuel flow is accompanied by an increase in flow through the metering valve 14 with a resultant increase in the differential pressure $(P_1-P_2)$ which indicate a fuel flow surplus through the given area of metering valve 14. Any fuel that is bypassed by the pressure regulating valve 20 is carried back to the inlet of pump 10.

A pressure relief valve 42 is connected in parallel with the regulating valve 20 to prevent fuel pressure $P_1$ from exceeding a selected value in the event of failure of regulating valve 20.

As indicated above, minimum pressurizing and shutoff valve 16 is disposed in the main line 12 downstream of the metering valve 14. The valve 16 serves to positively block off fuel from the engine and has the dual function of providing a minimum pressure to the control servos during initial starting and also providing a positive fuel shutoff. Minimum pressurizing and shutoff valve 16 comprises a chamber 44, spring 46 and valve element 48. Spring 46 biases valve element 48 toward a closed position and the relative strength of this spring and the force responsive area of the valve element created by the pressure acting in chamber 44 determine the pressure $P_2$ in the main line 12 downstream of the metering valve 14 which is necessary for the opening of this valve. As shown in the drawing, a line 50 communicates the chamber 44 with drain. A fixed orifice 52 is provided in the line 50 in order to provide a damping effect by restoring flow into and/or out of chamber 44 caused by movement of valve 16.

In order, during starting, to supplement the flow of fuel to the engine when fuel enrichment is required and to provide positive arrestment of all fuel flow in the event of an over-temperature condition, a fuel enrichment and hot start control system circuit 54, outlined by the dotted line box in the drawing, is provided. As shown, a line 56 communicates the upstream side of the throttle valve 14 with the downstream side thereof via a ball valve 58, an orifice member 66, a ball valve 68 and a lockout valve 74. The valve 58 is speed responsive and is open at turbine speeds of zero to just below idle and is closed at speeds of idle or above. As shown, the valve 58 comprises a ball 60 biased by spring 62 to the closed position against plunger 64 which is stroked by a conventional engine speed servo piston (not shown) whose position is proportional to engine speed squared ($N^2$). At zero engine speed, the ball is held open by the plunger. As engine speed increases during a start function, the speed servo piston is displaced to separate from plunger 64 and the ball is displaced by spring 62 and differential pressure until the ball is seated at an engine speed just below idle.

With the valve 58 open, the fuel in line 56 reaches orifice member 66 and flows therethrough with the pressure drop across the orifice (essentially $P_1-P_2$) being determined by the action of the spool valve 26. In the present case, it is preferred to have the pressure drop slightly less than that across the metering valve 14, the difference being sufficient to overcome the bias of spring 70 against the base 72 of check valve 68. Downstream of the check valve 68 is shown a lockout valve 74 which comprises a spool valve manually controlled by the pilot to select and control the amount of fuel enrichment, if any, desired. Summing up, it may be seen that, with the orifice 66 in parallel with main line 12 around metering valve 14 and in conjunction with valve 58, the pilot may, by manually controlling the lockout valve 74, simply and easily select the amount of fuel enrichment desired during starting.

In order to provide hot start protection, a bypass line 76, normally blocked by solenoid valve 78 communicates the inlet side of orifice member 66 with the backside of the minimum pressurizing and shutoff valve 16. The solenoid is adapted to receive an engine function signal, e.g., a turbine inlet temperature signal from the power plant which, if too high due to compressor stall or over-fueling or the like, causes the solenoid to open and fuel to flow, at $P_1$ pressure, to the backside of the shutoff valve 16, bypassing the orifice 66. As the shutoff valve closes, $P_1$ and $P_2$ increase equally until $P_1$ pressure opens the pump relief valve 42. During this time, $P_1$ plus the spring load acting on the backside of shutoff valve 16 overcomes $P_2$ to cause the shutoff valve to close completely, thereby completely arresting flow of fuel to the engine.

It will be appreciated, of course, that the hot start protection fuel enrichment functions described above are only effective at turbine engine speeds below idle, e.g., when — in the case of aircraft — the aircraft is on the ground. Once engine speed reaches idle, the solenoid, regardless of position, becomes ineffective (with respect to shutoff valve 16) since the ball valve 58 will block any flow to the solenoid valve. Thus the pressure on the backside of the shutoff valve 16 will be at $P_d$. To further ensure that the flow to solenoid valve 78 is blocked at the selected speed, ball valve 68 is provided to prevent flow from $P_2$ in the event that the manual selection of fuel enrichment inadvertently remains in the armed position at engine speeds of idle and above.

What has been set forth above is intended primarily as exemplary to enable those skilled in the art in the practice of the invention and it should therefore be understood that, within the scope of the appended claims the invention may be practiced in other ways than as specifically described.

We claim:

1. In a fuel control for a turbine type power plant having a combustion section, a pump for pressurizing fuel, main passage means connecting the discharge end of said pump to said combustion section, a throttle valve located in said passage means for metering fuel flow therein, shutoff valve movable between an open and a closed position in said main passage means downstream from said throttle valve, the improvement which comprises a fuel enrichment and hot start control system comprising:

first passage means in parallel relation with said main passage means communicating the upstream side of said throttle valve with the downstream side thereof for flowing additional fuel therethrough;

valve means in said first passage means responsive to turbine speed for permitting flow of said additional fuel when turbine speed is below idle;

an orifice member downstream of said speed responsive valve means through which the flow of said additional fuel is caused by a pressure drop substantially equal to the pressure drop across said throttle valve;

a manually operated valve in said first passage means for controlling said additional flow; and means responsive to an engine parameter for shunting said additional flow around said orifice member to said shutoff valve to activate said shutoff valve.

2. The invention of claim 1 including a check valve in said first passage means downstream of said orifice member to prevent reverse flow therethrough.

3. In a fuel control for a turbine type power plant having a pump for pressurizing fuel, main passage means connecting the discharge end of said pump to the combustion section of said power plant, a throttle valve located in said passage means for metering fuel flow therein, a shutoff valve movable between an open and a closed position in said main passage means downstream from said throttle valve, said shutoff valve having a first side portion and a second side portion, said first side portion being responsive to fuel pressure in said main passage means downstream from said throttle valve to urge said shutoff valve to said open position, the improvement which comprises a fuel enrichment and hot start control system comprising:

first passage means in parallel relation with said main passage means interconnecting the upstream side of said throttle valve with the downstream side thereof;

an orifice member in said first passage means for supplying additional fuel to said main passage means downstream from said throttle valve at a preselected flow rate and at a pressure substantially equal to the fuel pressure therein;

valve means in said first passage means responsive to the speed of said turbine for permitting fuel flow to said orifice member only when turbine speed is below idle;

second passage means communicating said first passage means on the upstream side of said orifice member with said second side portion of said shut-off valve; and means normally blocking flow in said second passage means responsive to a function of the turbine for unblocking flow therein.

4. The invention of claim 3 wherein said fuel enrichment and hot start control system includes manually operated valve means in said first passage means for controlling flow therein.

5. The invention of claim 4 wherein said speed responsive valve means is in said first passage means upstream of said orifice member.

6. The invention of claim 5 wherein said fuel enrichment and hot start control system includes a check valve in said first passage means downstream of said orifice member for preventing flow reversal in said first passage means.

* * * * *